United States Patent
Tomkins et al.

(10) Patent No.: US 11,777,811 B2
(45) Date of Patent: Oct. 3, 2023

(54) SYSTEMS AND METHODS FOR PRECISELY GENERALIZED AND MODULAR UNDERLAY/OVERLAY SERVICE AND EXPERIENCE ASSURANCE

(71) Applicant: Ciena Corporation, Hanover, MD (US)

(72) Inventors: Robert Kevin Tomkins, Ottawa (CA); Shelley A. Bhalla, Morrisville, NC (US); Emil Janulewicz, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/168,511

(22) Filed: Feb. 5, 2021

(65) Prior Publication Data
US 2022/0255810 A1    Aug. 11, 2022

(51) Int. Cl.
*H04L 41/06* (2022.01)
*H04L 41/0631* (2022.01)
*H04L 43/062* (2022.01)
*H04L 43/16* (2022.01)
*H04L 43/04* (2022.01)
*H04L 41/044* (2022.01)
*H04L 41/0659* (2022.01)
*H04L 41/16* (2022.01)

(52) U.S. Cl.
CPC ............ *H04L 41/16* (2013.01); *H04L 41/044* (2013.01); *H04L 41/065* (2013.01); *H04L 41/0631* (2013.01); *H04L 41/0661* (2023.05); *H04L 43/04* (2013.01); *H04L 43/062* (2013.01); *H04L 43/16* (2013.01)

(58) Field of Classification Search
CPC ... H04L 41/16; H04L 41/044; H04L 41/0631; H04L 41/065; H04L 41/0672; H04L 43/04; H04L 43/062; H04L 43/16
See application file for complete search history.

(56) References Cited

U.S. PATENT DOCUMENTS

| | | |
|---|---|---|
| 10,171,161 B1 | 1/2019 | Côté et al. |
| 10,756,976 B2 | 8/2020 | Tomkins et al. |
| 10,771,590 B2 | 9/2020 | Tomkins |
| 10,791,026 B2 | 9/2020 | Tomkins et al. |
| 10,862,771 B2 | 12/2020 | Tomkins et al. |
| 11,018,959 B1 * | 5/2021 | Neill ............... H04L 43/026 |

(Continued)

*Primary Examiner* — Mohamed A. Wasel
*Assistant Examiner* — Zonghua Du
(74) *Attorney, Agent, or Firm* — Baratta Law PLLC; Lawrence A. Baratta, Jr.

(57) ABSTRACT

Systems and methods include obtaining overlay telemetry data from a plurality of overlays, wherein each overlay is an application and there is a corresponding telemetry adaptor for each overlay; obtaining underlay telemetry data from one or more underlays, wherein each underlay includes physical infrastructure for supporting one or more of network, compute, and store functions for the plurality of overlays; analyzing the overlay telemetry data and the underlay telemetry data via a Key Performance Factor (KPF) model that correlates one or more of the plurality of overlays and the one or more underlays together; responsive to an anomaly or a threshold crossing based on the KPF model, performing a Root Cause Analysis (RCA) to identify a root cause of the anomaly or the threshold crossing; and mapping one or more actions with associated priorities to the root cause utilizing one or more remediation modules each associated with an overlay.

20 Claims, 6 Drawing Sheets

(56) References Cited

U.S. PATENT DOCUMENTS

| | | | |
|---|---|---|---|
| 11,537,627 B1* | 12/2022 | Baskaran | G06F 16/951 |
| 2017/0250892 A1* | 8/2017 | Cooper | H04L 41/5009 |
| 2017/0310546 A1* | 10/2017 | Nair | H04L 41/0654 |
| 2018/0077080 A1 | 3/2018 | Gazier et al. | |
| 2018/0248905 A1* | 8/2018 | Côté | H04L 41/145 |
| 2019/0081871 A1* | 3/2019 | Nazar | H04L 43/04 |
| 2019/0138948 A1 | 5/2019 | Janulewicz et al. | |
| 2019/0222491 A1* | 7/2019 | Tomkins | H04L 41/5087 |
| 2019/0230046 A1 | 7/2019 | Djukic et al. | |
| 2019/0280942 A1 | 9/2019 | Côté et al. | |
| 2019/0379572 A1* | 12/2019 | Yadav | H04L 41/046 |
| 2020/0162315 A1* | 5/2020 | Siddiqi | H04L 41/22 |
| 2020/0235986 A1* | 7/2020 | Embarmannar Vijayan | H04L 43/14 |
| 2020/0259700 A1 | 8/2020 | Bhalla et al. | |
| 2020/0287788 A1 | 9/2020 | Triplet et al. | |
| 2020/0401936 A1* | 12/2020 | Embarmannar Vijayan | G06F 11/3452 |
| 2021/0044508 A1* | 2/2021 | Jha | H04L 41/0233 |
| 2021/0051109 A1* | 2/2021 | Chitalia | G06F 9/45558 |
| 2021/0058323 A1* | 2/2021 | Thanneeru | H04L 12/2856 |
| 2021/0390423 A1* | 12/2021 | Latapie | H04L 41/0631 |

* cited by examiner

SYSTEMS AND METHODS FOR PRECISELY GENERALIZED AND MODULAR UNDERLAY/OVERLAY SERVICE AND EXPERIENCE ASSURANCE

FIELD OF THE DISCLOSURE

The present disclosure generally relates to networking. More particularly, the present disclosure relates to systems and methods for precisely generalized and modular underlay/overlay service and experience assurance.

BACKGROUND OF THE DISCLOSURE

As networks become automated, particularly through closed-loop automation, the need for human intervention and operation of the network is reduced as the automation system becomes adept at automated deployment (i.e., Order to Service) and problem resolution (i.e., Trouble to Repair). The current approach to evaluating network performance is based on a series of metrics (e.g., Performance Monitoring (PMs) and the like). While these provide insight into the operation of a network, it would be preferable to evaluate the operation in a similar manner to the business leaders and end customers of a service provider—the actual performance, flexibility, and value of the content, applications, and services operating on top of it. This ultimately allows the service provider the ability to deliver a consistent and targeted experience to the end customer while optimizing the cost while charging for the value of the service delivered with minimal Service Layer Agreement (SLA) based penalties.

As such, the network automation system must become aware of the applications, including their performance, cost factors, methods of remediation, relationship to the network and other applications, etc. To date, this has been done by software that is aware of a particular part of the network and one or two applications. Often each application/overlay requires its own piece of software that is not aware of the other applications/overlays. Recent market terminology calls this category of software "underlay/overlay assurance" based on "underlay/overlay" visualization from Software Defined-Wide Area Network (SD-WAN). In SD-WAN, an underlay network is a physical infrastructure above which an overlay network is built, e.g., it is the underlying network responsible for the delivery of packets across networks. An overlay network is a virtual network that is built on top of underlying network infrastructure. The present disclosure utilizes this concept and defines an underlay as the physical infrastructure and the overlay as the applications operating on top of the underlay. As described herein, "underlay/overlay" assurance leverages telemetry from one or two overlays as well as the telemetry of an underlay to automate resolutions to the network.

The underlay/overlay assurance approach is developing, and current solutions have limitations as discussed as follows. Current underlay/overlay assurance is not developed in a manner that allows for flexible, broad, multiple overlay assurance over the underlay and instead is tailored to one or two overlays. Also, the current underlay/overlay assurance is focused on a single type of underlay. An underlay/overlay assurance implementation typically focuses on repairing either the underlay or overlay and does not have the flexibility to work with third-party assurance products in the opposite category. The current underlay/overlay assurance implementation is typically aligned to a single telemetry provider or a single type of telemetry. Also, the current underlay/overlay assurance implementation is hardcoded with just a two-level overlay underlay hierarchy. Further, the underlay/overlay assurance implementation is unaware of how problems caused by an overlay or the underlay can be mediated by another overlay or the underlay. A federated model of underlay/overlay assurance is missing.

As an underlay or set of underlays that work together as a federation, the underlay has the strategic position of seeing all components—oxymoronically a high ground position. It makes no sense that the applications (overlays) have an end-to-end view of all subcomponents; there are too many applications and too much complexity to scale in that implementation. A peer-to-peer alternative could be devised, but there is still the need for something to pull it all together, which would require sizable intelligence in each application about infrastructure.

BRIEF SUMMARY OF THE DISCLOSURE

The present disclosure relates to systems and methods for precisely generalized and modular underlay/overlay service and experience assurance. The present disclosure includes an approach to ensure customer application satisfaction at target levels while optimizing network cost and automation. In various embodiments, the present disclosure includes a method with steps, an apparatus configured to implement the steps, a non-transitory computer-readable medium having instructions stored thereon for programming one or more processors to perform the steps.

The steps include obtaining overlay telemetry data from a plurality of overlays, wherein each overlay is an application and there is a corresponding telemetry adaptor for each overlay; obtaining underlay telemetry data from one or more underlays, wherein each underlay includes physical infrastructure for supporting one or more of network, compute, and store functions for the plurality of overlays; analyzing the overlay telemetry data and the underlay telemetry data via a Key Performance Factor (KPF) model that correlates one or more of the plurality of overlays and the one or more underlays together; responsive to an anomaly or a threshold crossing based on the KPF model, performing a Root Cause Analysis (RCA) to identify a root cause of the anomaly or the threshold crossing; and mapping one or more actions with associated priorities to the root cause utilizing one or more remediation modules each associated with an overlay.

The one or more underlays can include a plurality of underlays. The plurality of underlays can include any of metro networks, cloud networks, regional networks, wireless infrastructure, and Software Defined-Wireless Area Network (SD-WAN) infrastructure. The plurality of underlays and the plurality of overlays can be arranged in a hierarchical model. At least two of the plurality of overlays can be from different vendors, and wherein each corresponding telemetry adaptor can be configured to normalize generalized telemetry collection. The KPF model can be configured to adapt the overlay telemetry data and the underlay telemetry data from multiple vendor specific telemetry models to measure performance of an overlay. The RCA can utilize any of unlearned or learned Artificial Intelligence, anomaly detection, threshold crossing, and weakest link analysis. The one or more remediation modules can be configured to utilize the root cause to one or more of enact a change in the underlay, enact a change in the plurality of overlays, and communicate results.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

The present disclosure relates to systems and methods for precisely generalized and modular underlay/overlay service and experience assurance. The present disclosure includes an approach to ensure customer application satisfaction at target levels while optimizing network cost and automation.

Definitions

Underlay—an underlay includes physical networking and/or computing infrastructure including network elements configured to provide connections, wavelengths, services, etc. at Layers 0 (photonic), Layer 1 (Time Division Multiplexing (TDM), wireless, etc.), Layer 2 (packet, i.e., Ethernet, Wireless Local Area Network (WLAN), etc.), Layer 3 (Internet Protocol (IP)), etc. The term underlay is used to include all such physical infrastructure and may include multiple layers, multiple networks, multiple service providers, etc. Again, an underlay or set of underlays work together as a federation, and the underlay has the strategic position of seeing all components. Each network element in the underlay is configured to provide underlay telemetry data such as PM data and the like. The underlay can include physical infrastructure for supporting one or more of network, compute, and store functions for a plurality of overlays.

Overlay—an overlay is one or more applications being implemented on the underlay. The present disclosure introduces a telemetry adaptor for each overlay to support overlay telemetry data. Of note, the overlay can also extend to overlay infrastructures as well, such as, for example, in a hierarchical implementation. The layer 0/1/2/3 infrastructure could be an underlay to a content delivery infrastructure overlay, which is in turn underlay to a video infrastructure overlay, which is in turn underlay to a video on demand streaming service application, a live streaming video service application, and an audio/video conferencing application. The construct here should apply to a system trying to determine if a live streaming video service is having a service specific issue, a video infrastructure issue, a content distribution issue, and/or a network issue.

Flow—in a network, a flow is a sequence of packets or other traffic from a source node to a destination node. RFC 3697 defines traffic flow as "a sequence of packets sent from a particular source to a particular unicast, anycast, or multicast destination that the source desires to label as a flow. A flow could consist of all packets in a specific transport connection or a media stream. However, a flow is not necessarily 1:1 mapped to a transport connection." Flow is also defined in RFC 3917 as "a set of IP packets passing an observation point in the network during a certain time interval."

Underlay/Overlay Assurance

This present disclosure solves the problem of mapping a multitude of different overlay assurance and telemetry models to a common underlay assurance model. At its essence, when breaking down underlay/overlay service assurance, there is a mapping of n telemetry source types to determine an application or content's performance. This application or content's performance must be quantified into m key performance criteria, often on a per-flow or user basis, which may be aggregated into further criteria measurement for aggregate flows or user groups based on a multitude of unifying criteria. Further, there must exist x mechanisms to extrapolate the root cause of a given application's performance across the overlay and underlay. The application will have a policy that identifies p thresholds or criteria that identify when an event has occurred, and root cause analysis is required. Further, there will be y remediation techniques to be applied by the underlay largely based on the root cause. Of course, in a given implementation of underlay/overlay service assurance, there will be z applications. All of which must be processed in real-time or near real-time by the underlay/overlay assurance system.

Figure 1:
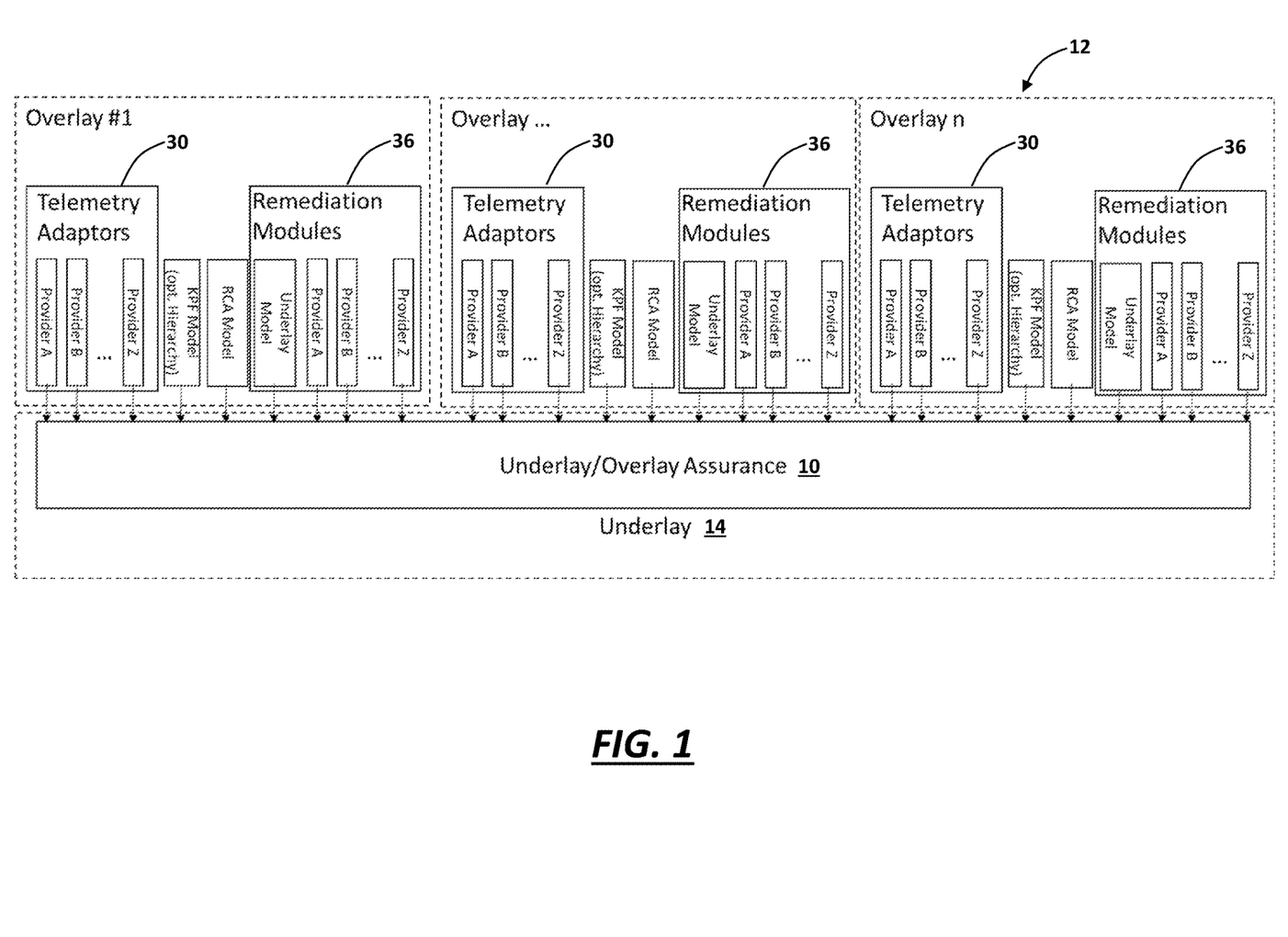
FIG. 1 is a block diagram of an underlay/overlay service assurance system between multiple overlays and a single underlay.
Figure 2:
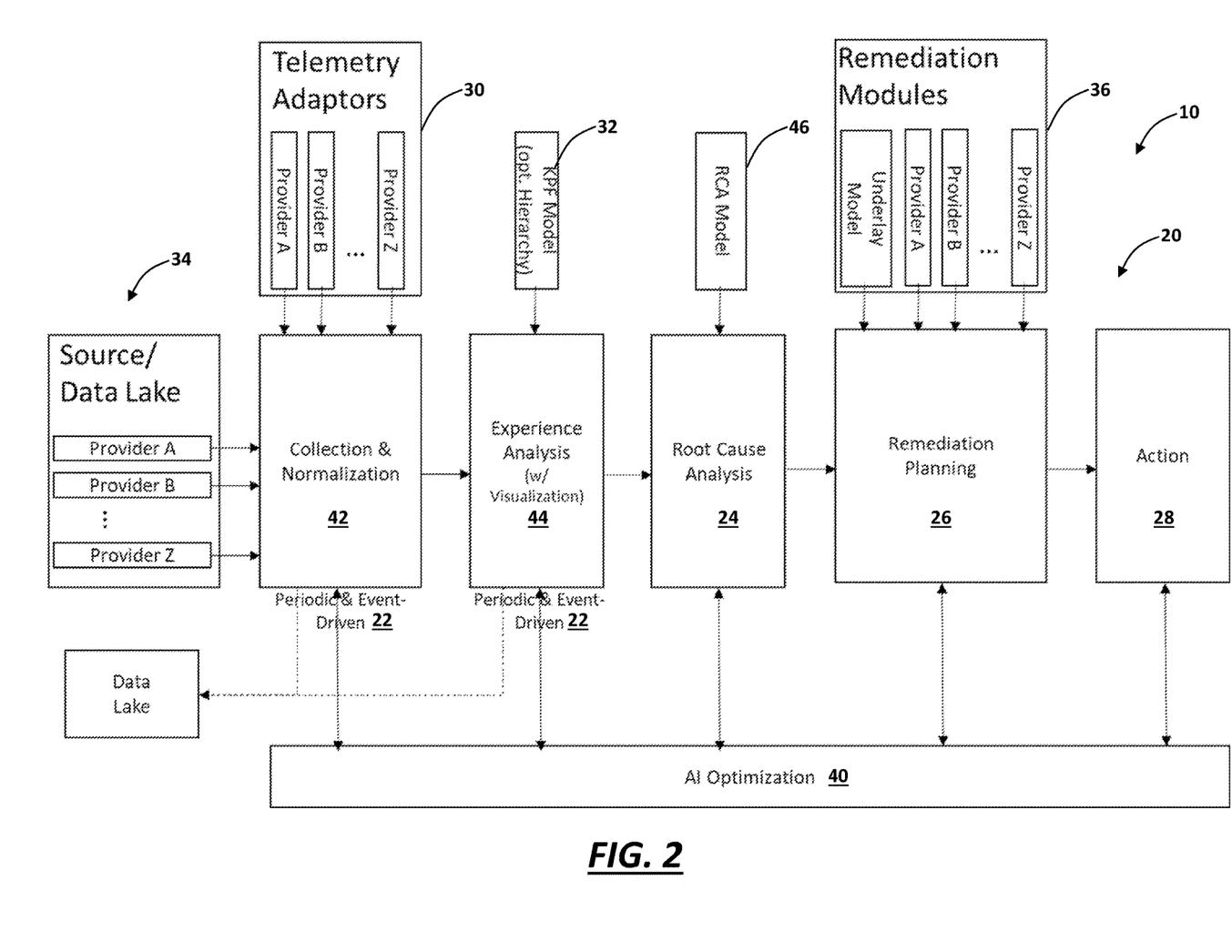
FIG. 2 is a block diagram of the functionality of the underlay/overlay service assurance system of FIG. 1 from the underlay's perspective.
Figure 3:
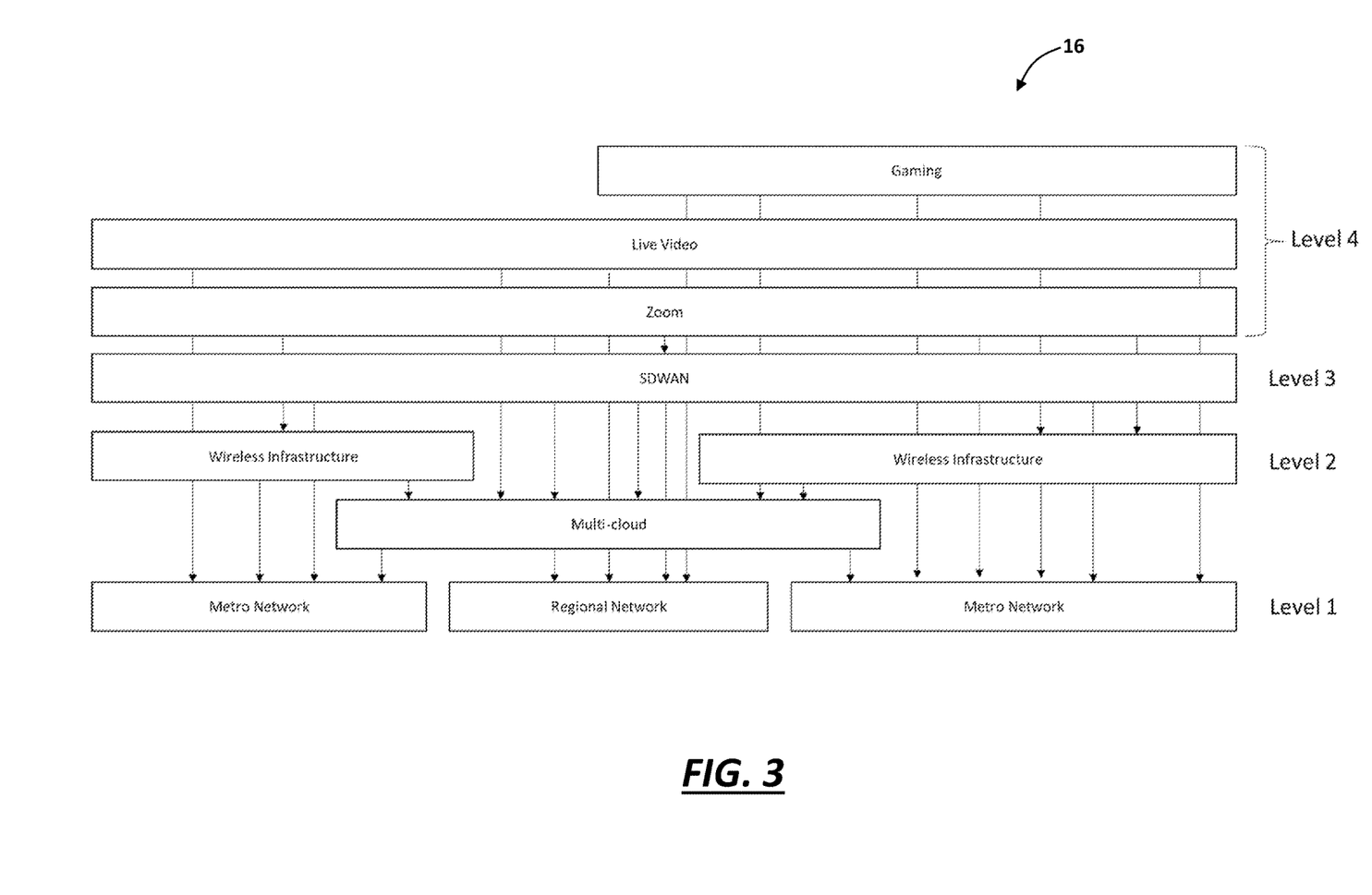
FIG. 3 is a block diagram of an example underlay/overlay hierarchical model.
Figure 4:
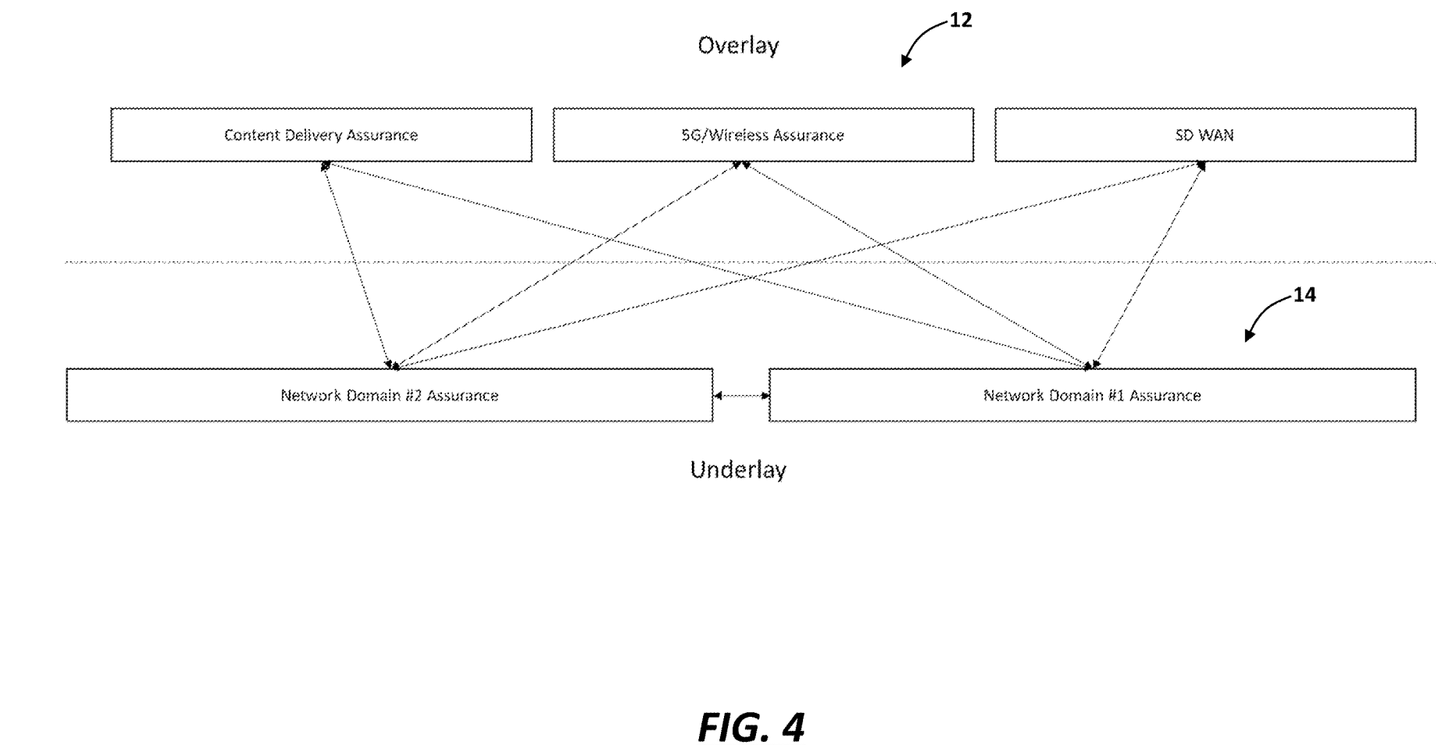
FIG. 4 is a block diagram of underlay/overlay service assurance between multiple overlays and multiple underlays.

FIG. 1 is a block diagram of an underlay/overlay service assurance system 10 between multiple overlays 12 and a single underlay 14. FIG. 2 is a block diagram of the functionality of the underlay/overlay service assurance system of 10 from the underlay's perspective. FIG. 3 is a block diagram of an example underlay/overlay hierarchical model 16. FIG. 4 is a block diagram of underlay/overlay service assurance between multiple overlays 12 and multiple underlays 14.

The underlay/overlay service assurance system 10 is designed to scale for all assured overlay 12 applications and content, current and future. In this context, the system 10 must break the current application integrated model and become far more modular, allowing the system 10 to focus on the processing of abstracted information. In this context, the underlay/overlay service assurance system 10 will ensure the telemetry from the sum $n_1$ to $n_z$ sources is collected, ensure that $>=z$ processes are acting upon that telemetry to both normalize the telemetry and generate the sum of mi to in, key performance factor values on a per-flow, user, path, or application basis. Further, the underlay/overlay service assurance system 10 must ensure that aggregation processes leverage the key performance factor values, and, in some circumstances, additional telemetry collected to generate aggregated key performance factors values—which may further result in additional hierarchical performance factors generated in a hierarchical fashion, such as in the model 16.

The underlay/overlay service assurance system 10 must ensure a policy system 20 is active to identify if an event occurs. The policy system can be triggered on a periodic or event-driven basis 22 to assess all or a subset of the key performance factor values. When outside a particular threshold p, whether fixed, dynamic or relative, an underlay root cause analysis 24 performance process associated with the threshold must be activated to determine the root cause. In turn, that process must respond back to the core system, which in turn activates a remediation determination process 26 to determine action or action(s) 28 to be taken. The system 10 must then be able to receive the determinate actions and to take those actions 28.

To do this, the concept of a telemetry adaptor 30 is introduced. The telemetry adaptor 30 is specific to a telemetry source and can be a microservice, process, or model that defines the following:

Frequency/Events driving telemetry;
Techniques(s) of telemetry sharing (e.g., Apache Kafka bus, Apache NiFi, File Transfer Protocol (FTP), etc.);
Source(s) of the telemetry;
Sink(s) for delivery of the telemetry;
Model of the telemetry variables relevant to process;
Processes/Services/Model(s) for telemetry variable normalization on a variable by variable basis, where a variable requires normalization;
May include method/source/destination/model of Artificial Intelligence (AI) training data pertaining to similar telemetry; and
Process/Service/Model 32 for generating Key Performance Metric (KPM) values based on telemetry provided.

In addition, the concept of an application-specific Key Performance Factor (KPF) model 32 is introduced. This application-specific KPF model 32 utilizes a combination of several KPM's linked to one or many overlay 12 and underlay 14 layers correlated together. The model 32 can map to an overlay 12 or underlay 14 layer, algorithms, programs, or AI techniques to determine values for each KPF, which may in turn be leveraged by the next level of key performance factors in the model 32.

The underlay root cause analysis 24 modules leverage KPF values, and in some cases, additional telemetry, such as from a source and/or data lake 34, attempt to identify a root cause. Note that multiple root causes may be analyzed by one module, multiple root cause analysis routines may be operational at a given moment and that root cause analysis modules may be application or layer (overlay/underlay) specific or more broadly apply key performance factor values from multiple applications to the same underlay 14.

Remediation modules 36 map root causes to one or more actions 28 with associated priorities and hierarchical and configurable methods of execution. These actions 28 can include underlay operator messaging, interfacing with a ticketing system for the underlay 14, directing the underlay orchestrator, messaging to an overlay/application management system, messaging to an overlay/application assurance system. In order to interface with third-party systems, action modules must be defined as an API to these systems.

All of the actions 28 may require human intervention and approval before the actions are executed. Humans can override this default behavior for each action and allow the AI to automatically execute the actions. All actions that are executed by a human or automatically must be recorded in an audit log. Some actions should also be allowed to revert the change automatically if the action was unsuccessful/incomplete or caused an adverse reaction in the network. Humans will also be allowed to revert action/s.

The underlay/overlay service assurance system 10 may also house an AI component 40 that looks at how the remediation resolved the problem and make adjustments on telemetry collected 42, adjust normalization of telemetry key performance factor calculations such as via an experience analysis 44, root cause analysis 24 processes, and remediation priorities planning 26 and action 28.

EXAMPLE 1

As an example, an underlay/overlay ecosystem could be defined with the overlay 12 including SD-WAN, Live Video (content delivery), and a 5G infrastructure requiring multi-layer assurance, such as in FIG. 4. The underlay 14 could be an IP network that spans a geographic area that covers the enterprise sites requiring SD-WAN, the 5G infrastructure, and the sourcing live video event, its associated studios, and editing facilities, as well as distribution to the customer. Telemetry for the 5G infrastructure could be pulled from the 5G Radio Access Network (RAN) system, the 5G Core system, and the mobile phones. Similarly, the video system's telemetry could include a vs. b measurements of the video from the event to studio/editing, and editing to the origin, along with a Content Delivery Network (CDN), and end-user device video player measurements. Finally, the SD-WAN management system and network devices may provide their own telemetry into the system 10. Each of these telemetry sources would have a different telemetry adaptor 30. Similarly, this instantiation of the underlay 14 would be dependent on telemetry from inventory, path computation and topology engine applications and would require information from network controllers if it were to extend to the optical domain. Furthermore, with the intent of proactive monitoring, the underlay can capture real-time move/add/change and delete (MACD) of overlay/underlay service chains from service orchestrators.

The telemetry adaptor 30 for the end-user video device would provide all the information on how to determine key performance factors like time to content start, end-user QoE, etc., from an end-user perspective, but can also be used to apply a factor to each path the flow is running upon. While an a vs. b measurement would be likely to focus on a subsection of the network and be more strongly weighted to bring out the importance/likelihood of a problem on the applicable segment. However, combining the two through the application-specific key performance factor module allows the system to clearly prioritize not only what parts of the network are having the problem but also which segments are most heavily impacting end users by volume and degree of degradation to ensure that the biggest problems are addressed by the system first. Note that generation of a key performance factor may occur on a periodic basis, on an event-driven basis or both. The telemetry and the resulting KPFs are likely asynchronous and priority adaption based on the timeliness of the information may be valuable. For example, a per-flow Quality of Experience (QoE) experience (which could be calculated by resolution, bitrate, buffer ratio, buffering, and time to start), time to start, and state metric on a per-flow basis may be key. However, the next level of hierarchy may be to take an aggregate measure of all flows operating over the same link/port to understand the number of unacceptable QoE flows on the port and server (by policy) based on QoE and Time to Start values of the individual flows. At a high level, the overall level of unacceptable QoE flows in the network (again by policy) as well as the average and time to start range could be tracked, as well as overall flow state based on recent errored flows, buffer flows, abandoned flows could signal additional insights on the overall system.

The root cause analysis system could leverage historical knowledge captured in tribal knowledge bases and also have AI learn from humans the appropriate actions to take based on the telemetry, KPF and changes at the networking layer. This could be further enhanced through communication with the overlay service assurance system to learn additional telemetry and to understand when the problem is resolved in the overlay 12 versus the underlay 14. The Root Cause Analysis 24 could also be a simple set of rules that trigger on the basic anomaly detection, threshold crossing, or weakest link management. For example, a sudden change in time to start could suggest a change in latency caused by resource contention or a routing change. Based on the server and link analysis, it is likely to derive to a single source of concern that can be resolved through the remediation module, which could take actions like redirection of resources with an overlay assurance module like redirection traffic to different servers or modify the SD-WAN the video is flowing on, closed-loop network automation actions like spinning up Virtual Network Functions (VNFs), modifying bandwidth, or escalated ticketing. From a weakest link standpoint, assurance software could be programmed to highlight the port with congestion impacting the most video flows and remediate through remediation modules.

In addition, the concept of federating multiple underlays 14 (from a single or multiple operators) can be facilitated by generating of an assurance coordinator that leverage metrics, Root Cause Analysis, and remediation modules from individual underlay assurance systems to identify the singular most likely cause of problems that extend beyond a single underlay.

EXAMPLE 2

Figure 5:
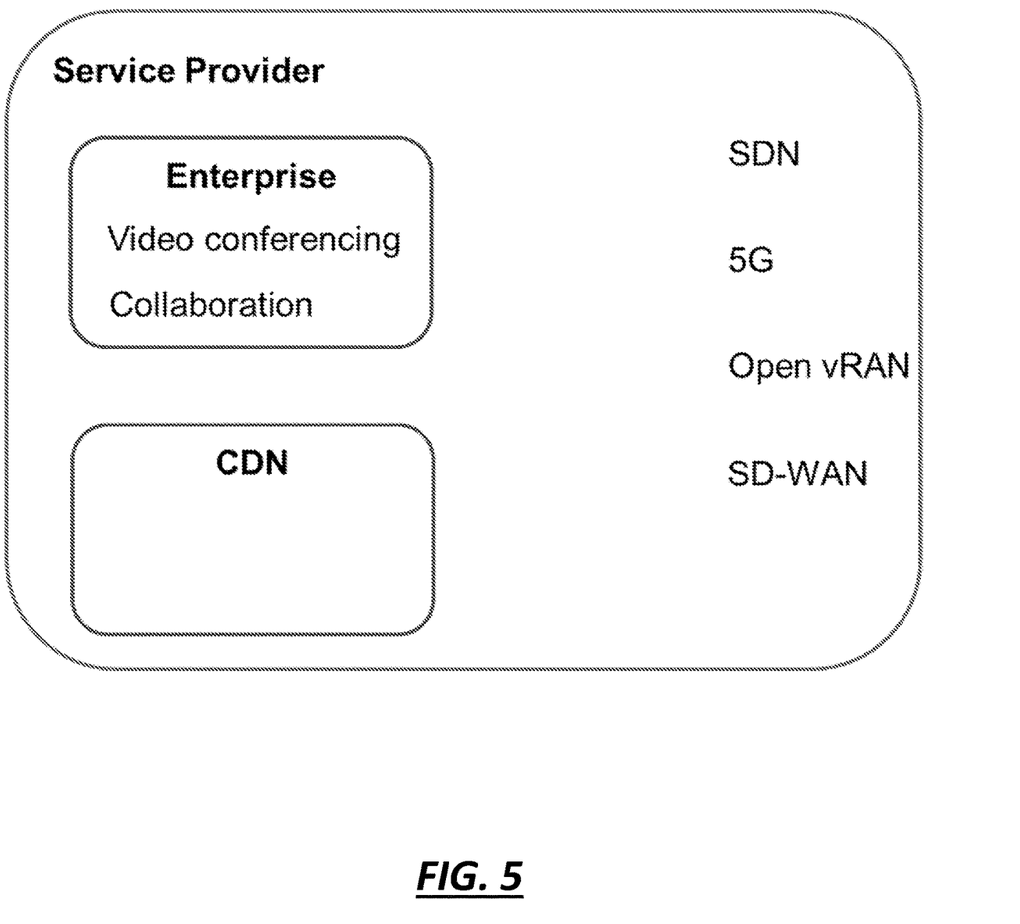
FIG. 5 is a block diagram of a data lake for an example embodiment.

FIG. 5 is a block diagram of a data lake for an example embodiment. In this example, telemetry adaptors 30 for a service provider managed network underlay 14 would pull all relevant data on defined intervals as well as receive event notifications from the telemetry sources, noting that data from third-parties can be pre-filtered and provided by their own data lakes. This is collected and normalized 42 and placed in our data lake as well as passed on to experience analysis 44.

In this example, the video conferencing can be Zoom. Assume, suddenly, several Zoom telemetry event messages are received indicating buffering, in the collection and normalization 42. The experience analysis 44 recognizes an anomaly or a threshold crossing based on network KPFs for Zoom and digs deeper. There can be detailed information from a variety of other flows indicate a resolution reduction in a variety of other flows. The experience analysis 44 identifies the event against the KPF that this is potentially a network issue and initiates root cause analysis 24. The root cause analysis 24 deconstructs the Zoom flow messages, which identifies the source, type of service (webinar), tele-stream processing flow ID, the CDN in use, the Service Provider (SP), the enterprise, and all the (pre and post Network Address Translation (NAT)) IP addresses experiencing diminished or bad QoE.

The root cause analysis 24 identifies all services for the enterprise to identify that they have an SD-WAN infrastructure with an identified set of services. Using ROA data and the IP addresses from Zoom, the potential set of SD-WAN services can be pruned to just those experiencing the degradation.

For example, the SD-WAN telemetry indicates a switch from Multiprotocol Label Switching (MPLS) to a Long-Term Evolution (LTE) network during the outage, so the root cause analysis 24 initiates investigations of telemetry from each of all degraded Zoom flows, the tele-stream flow, the CDN origin to degraded destinations, the SD-WAN instances, the LTE core, the LTE RAN, and the routed network from the source entry point(s) to the destination exit point(s). Probabilities for the root cause are identified in each case based on the degree of anomalous/threshold readings in each as well as commonality with a percentage of affected application flows and potential remediation from upper layers, including end-user contained within RCA modules.

The root cause analysis investigation threads are checked to ensure data collected includes the initial degradation timing and a predefined portion of time-based on an RCA model 46 for that specific telemetry. Some telemetry requires post-processing, and a cause may not be ruled out until that processing is complete. If sufficient data is not available, the thread is reinstated after the timing is complete.

All root cause threads that identify a significant anomaly then pass that anomaly and its relevant data to the remediation planning 26 engine. The remediation planning 26 engine may (based on the remediation modules 36) reach out to other assurance systems (e.g., CDN, SD-WAN, Zoom) when they were identified to have high potential root cause, to see if they have remediation underway for that customer. Other assurance systems may also request remediation from the underlay assurance system. Based on remediation module 36 for that system, it may be necessary to hold off on action until the remediation from another assurance system is complete and then have experience analysis confirm repair or ongoing anomaly.

The remediation planning 26 engine would pass remediation action to the action 28 component as per remediation modules 36 directives based on root cause likelihood and nature of the anomaly. Once the issues have been remediated, the remediation modules 36 should consider whether to revert. A subset of the data provided into and derived from the collection and normalization 42, the experience analysis 44, the root cause analysis 24, the remediation planning 26, and the actions 28 are provided into the AI optimization 40 module, which reviews the process and timings to self-optimize the process by adjusting the telemetry adaptors 30, data collection, data normalization, the KPF modules 32 and the experience analysis, the RCA model 46 and component, and the various remediation modules 36 and remediation planning 26, and even how the action 28 component takes action on the remediations.

The following provide example actions for the Zoom example. Those skilled in the art will recognize Zoom is just presented as one example and there can be many overlays 12. For Zoom, the following anomalies may be found along traffic paths: tele-stream issues, CDN issues, SD-WAN+LTE and/or landing service provider network issues, SD-WAN issues, LTE RAN issues, network issues, end customer anomalies, etc.

For tele-stream issues, the actions can include an operator/customer notification (Zoom has to make a change) and the notification can be to a Zoom API if Zoom is provided as a managed service. For CDN issues, actions can include an operator/customer notification and communication with CDN assurance to ensure remediation is in progress, spinning up additional CDN VNFs or adding resources, if possible, and the like.

For SD-WAN+LTE and/or landing service provider network issues, the remediation module 36 may request SD-WAN switch access from mobile to land or vice versa, a virtual SD-WAN instance could also be moved to an alternate location, it is possible for the reduction of background traffic (e.g., rate-limiting applications being executed on a user device), and the like.

For SD-WAN issues, the actions can include signaling issue to operator/customer, and/or communicating with SD-WAN assurance to ensure remediation is in progress. If the SD-WAN is not remediating, network remediation can be performed such as cutting back background traffic of applications either via rate-limiting or by communication with the applications or alternatively adding resources to SD-WAN processing.

For an LTE RAN issue, the actions can include signaling the issue to operator/customer, communicating with SD-WAN, etc. For network issues, the actions can include looking for routing changes/congestion that lines up with issue, particularly at flow convergence points, causing routing changes such as looking to re-optimize routing perhaps different flows taking different directions, and the like. For congestion, the actions can include reducing background traffic (e.g., OneDrive) to reduce congestion point, rerouting background or critical traffic on different paths, consider spinning up SD-WAN/VNF resources where they could reduce traffic, and the like.

For end customer anomalies, the actions can include looking for areas without telemetry (e.g., Wi-Fi) for convergence points of bad flows, notifications, looking at telemetry from other applications, dialing back applications on applications experiencing degradation or excessive demand.

Process

Figure 6:
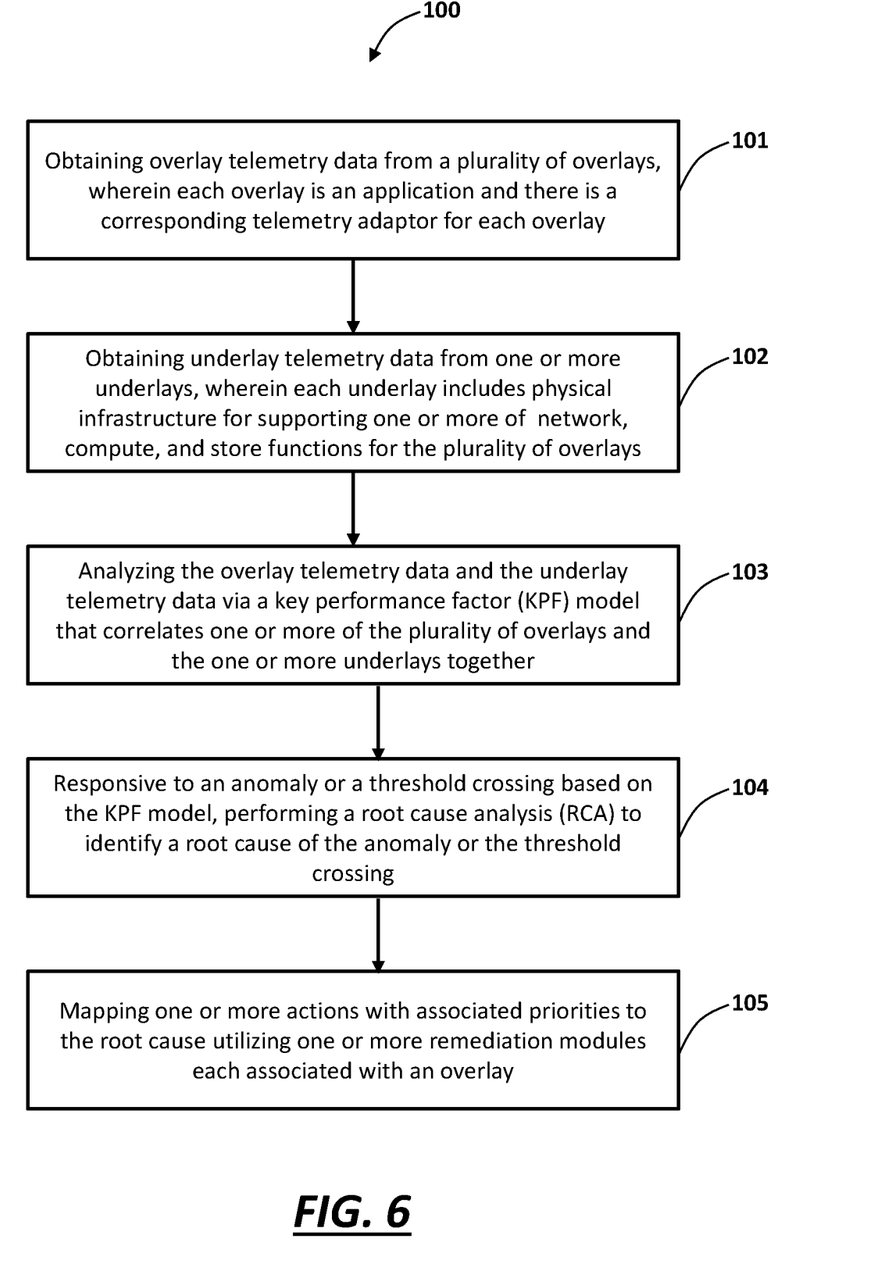
FIG. 6 is a flowchart of a process for precisely generalized and modular underlay/overlay service and experience assurance.

FIG. 6 is a flowchart of a process 100 for precisely generalized and modular underlay/overlay service and experience assurance. The process 100 can be implemented as a method that includes steps, via an apparatus with one or more processors configured to implement the steps, and as instructions stored in a non-transitory computer-readable medium for programming one or more processors to perform the steps. For example, the process 100 can monitor the KPFs post remediation to ensure the anomaly/issue is resolve and feeds that success/failure into the AI module.

The process 100 includes obtaining overlay telemetry data from a plurality of overlays, wherein each overlay is an application and there is a corresponding telemetry adaptor for each overlay (step 101); obtaining underlay telemetry data from one or more underlays, wherein each underlay includes physical infrastructure for supporting one or more of network, compute, and store functions for the plurality of overlays (step 102); analyzing the overlay telemetry data and the underlay telemetry data via a Key Performance Factor (KPF) model that correlates one or more of the plurality of overlays and the one or more underlays together (step 103); responsive to an anomaly or a threshold crossing based on the KPF model, performing a Root Cause Analysis (RCA) to identify a root cause of the anomaly or the threshold crossing (step 104); and mapping one or more actions with associated priorities to the root cause utilizing one or more remediation modules each associated with an overlay (step 105).

That is, the process 100 assures the right service assurance and even QoE (not just the Quality of Service (QoS)) for any mix of overlay application(s) (network or otherwise) over any underlay network/compute/store infrastructure through discrete telemetry adaptation, application-specific Key Performance Factor models, underlay and application-specific root cause analysis adaptation modules and application-specific remediation actions, and a generalized and/or application/underlay specific AI learning modules that adapt the KPF, RCA, and remediation issues.

The process 100 is an assurance process separate from the application/Network Function that pulls together end-to-end assurance, including the coordination of different assurance capabilities, across application and infrastructure components for an aggregate group of customers and all their services and experiences. Further, that this separate assurance process can be merged into the underlay assurance, like network assurance, to reduce processing as it or a federation of like underlays is most likely to relate to the full set of applications and infrastructure for a given customer or set of customers.

The one or more underlays can include a plurality of underlays. The plurality of underlays can include any of metro networks, cloud networks, regional networks, wireless infrastructure, and Software Defined-Wireless Area Network (SD-WAN) infrastructure. The plurality of underlays and the plurality of overlays can be arranged in a hierarchical model. That is, this can be a hierarchical overlay/underlay model that understands and a subset of the overlays plus the underlay can represent an underlay for other overlays. This can also include a unified federated assurance model and process that leverages a subset of the telemetry, KPF, RCA, and remediation solutions to assure services that cross multiple underlays.

At least two of the plurality of overlays can be from different vendors, and wherein each corresponding telemetry adaptor is configured to normalize generalized telemetry collection. The vendor-specific telemetry adaptation modules that adapt a generalized telemetry collection and normalization to one or more vendors' specific telemetry to create telemetry normalized to that overlay/underlay.

The KPF model can be configured to adapt the overlay telemetry data and the underlay telemetry data from multiple vendor-specific telemetry models to measure performance of an overlay. Application-Specific Key Performance Factor modules adapt the overlay/underlay telemetry, which may come from multiple vendor-specific telemetry models, to measure the performance of an application. There may be multiple such models (e.g., by application) in over a single underlay.

The RCA can utilize any of unlearned or learned Artificial Intelligence, anomaly detection, threshold crossing, and weakest link analysis. The root cause analysis modules define how to determine root causes either through unlearned or learned AI modules, anomaly detection, threshold crossing, or weakest link analysis. By pulling in normalized Key Performance factors and applying policies specific to the overlays relevant to the underlay, the system will determine root causes to problems relevant to the service provider and its customers based on not just the network but also in the context of the overlay applications or content as well.

The one or more remediation modules are configured to utilize the root cause to enact a change in the underlay, enact a change in the plurality of overlays, or communicate results. Remediation modules leverage a generalized remediation module that is customized through overlay, underlay, and operationally specific (which may be general or vendor-specific) modules to take the RCA results and enact a change in the underlay, one or more the overlay(s), or communicate with key stakeholders. Again, the remediation chosen can be selected by unlearned or learned AI modules, anomaly detection, threshold crossing, or weakest link analysis but maps out to a remediation procedure provided by one or more of overlay remediation models, the underlay remediation module, or the operational remediation module.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming one or more processors to perform steps of:
    obtaining overlay telemetry data from a plurality of overlays, wherein each overlay is an application and there is a corresponding telemetry adaptor for each overlay;
    processing the overlay telemetry data with the corresponding telemetry adaptors to normalize associated variables from one or more vendors' specific telemetry to a normalized generalized telemetry, each telemetry adaptor of the corresponding telemetry adaptors is configured to adapt a vendor's specific telemetry to the normalized generalized telemetry;
    obtaining underlay telemetry data from one or more underlays, wherein each underlay includes physical infrastructure for supporting one or more of network, compute, and store functions for the plurality of overlays, wherein the normalized generalized telemetry is normalized to the underlay telemetry data;
    analyzing the normalized generalized telemetry and the underlay telemetry data via a Key Performance Factor (KPF) model that correlates one or more of the plurality of overlays and the one or more underlays together;
    responsive to an anomaly or a threshold crossing based on the KPF model, performing a Root Cause Analysis (RCA) to identify a root cause of the anomaly or the threshold crossing; and
    mapping one or more actions with associated priorities to the root cause utilizing one or more remediation modules each specific to a corresponding vendor of the one or more vendors.

2. The non-transitory computer-readable medium of claim 1, wherein the one or more underlays include a plurality of underlays.

3. The non-transitory computer-readable medium of claim 2, wherein the plurality of underlays include any of metro networks, cloud networks, regional networks, wireless infrastructure, and Software Defined-Wireless Area Network (SD-WAN) infrastructure.

4. The non-transitory computer-readable medium of claim 2, wherein the plurality of underlays and the plurality of overlays are arranged in a hierarchical model.

5. The non-transitory computer-readable medium of claim 1, wherein at least two of the plurality of overlays are from different vendors, and wherein each corresponding telemetry adaptor is configured to normalize generalized telemetry collection.

6. The non-transitory computer-readable medium of claim 1, wherein the KPF model is configured to adapt the overlay telemetry data and the underlay telemetry data from multiple vendor specific telemetry models to measure performance of an overlay.

7. The non-transitory computer-readable medium of claim 1, wherein the RCA utilizes any of unlearned or learned Artificial Intelligence, anomaly detection, threshold crossing, and weakest link analysis.

8. The non-transitory computer-readable medium of claim 1, wherein the one or more remediation modules are configured to utilize the root cause to one or more of enact a change in the underlay, enact a change in the plurality of overlays, and communicate results.

9. An apparatus comprising:
    one or more processors and memory comprising instructions that, when executed, cause the one or more processors to
        obtain overlay telemetry data from a plurality of overlays, wherein each overlay is an application and there is a corresponding telemetry adaptor for each overlay,
        process the overlay telemetry data with the corresponding telemetry adaptors to normalize associated variables from one or more vendors' specific telemetry to a normalized generalized telemetry, each telemetry adaptor of the corresponding telemetry adaptors is configured to adapt a vendor's specific telemetry to the normalized generalized telemetry,
        obtain underlay telemetry data from one or more underlays, wherein each underlay includes physical infrastructure for supporting one or more of network, compute, and store functions for the plurality of overlays, wherein the normalized generalized telemetry is normalized to the underlay telemetry data,
        analyze the normalized generalized telemetry and the underlay telemetry data via a Key Performance Factor (KPF) model that correlates one or more of the plurality of overlays and the one or more underlays together, responsive to an anomaly or a threshold crossing based on the KPF model, perform a Root Cause Analysis (RCA) to identify a root cause of the anomaly or the threshold crossing, and map one or more actions with associated priorities to the root cause utilizing one or more remediation modules each specific to a corresponding vendor of the one or more vendors.

10. The apparatus of claim 9, wherein the one or more underlays include a plurality of underlays.

11. The apparatus of claim 9, wherein at least two of the plurality of overlays are from different vendors, and wherein each corresponding telemetry adaptor is configured to normalize generalized telemetry collection.

12. The apparatus of claim 9, wherein the KPF model is configured to adapt the overlay telemetry data and the underlay telemetry data from multiple vendor specific telemetry models to measure performance of an overlay.

13. The apparatus of claim 9, wherein the RCA utilizes any of unlearned or learned Artificial Intelligence, anomaly detection, threshold crossing, and weakest link analysis.

14. The apparatus of claim 9, wherein the one or more remediation modules are configured to utilize the root cause to one or more of enact a change in the underlay, enact a change in the plurality of overlays, and communicate results.

15. A method comprising:
obtaining overlay telemetry data from a plurality of overlays, wherein each overlay is an application and there is a corresponding telemetry adaptor for each overlay;

processing the overlay telemetry data with the corresponding telemetry adaptors to normalize associated variables from one or more vendors' specific telemetry to a normalized generalized telemetry, each telemetry adaptor of the corresponding telemetry adaptors is configured to adapt a vendor's specific telemetry to the normalized generalized telemetry;

obtaining underlay telemetry data from one or more underlays, wherein each underlay includes physical infrastructure for supporting one or more of network, compute, and store functions for the plurality of overlays, wherein the normalized generalized telemetry is normalized to the underlay telemetry data;

analyzing the normalized generalized telemetry and the underlay telemetry data via a Key Performance Factor (KPF) model that correlates one or more of the plurality of overlays and the one or more underlays together;

responsive to an anomaly or a threshold crossing based on the KPF model, performing a Root Cause Analysis (RCA) to identify a root cause of the anomaly or the threshold crossing; and mapping one or more actions with associated priorities to the root cause utilizing one or more remediation modules each specific to a corresponding vendor of the one or more vendors.

16. The method of claim 15, wherein the one or more underlays include a plurality of underlays.

17. The method of claim 15, wherein at least two of the plurality of overlays are from different vendors, and wherein each corresponding telemetry adaptor is configured to normalize generalized telemetry collection.

18. The method of claim 15, wherein the KPF model is configured to adapt the overlay telemetry data and the underlay telemetry data from multiple vendor specific telemetry models to measure performance of an overlay.

19. The method of claim 15, wherein the RCA utilizes any of unlearned or learned Artificial Intelligence, anomaly detection, threshold crossing, and weakest link analysis.

20. The method of claim 15, wherein the normalized generalized telemetry includes a sum of key performance factor values on one or more of a per flow, user, path, and application basis.

* * * * *